United States Patent [19]
Adams et al.

[11] Patent Number: 5,388,724
[45] Date of Patent: Feb. 14, 1995

[54] COFFEE FILTER STORAGE AND DISPENSING CANISTER

[76] Inventors: Tracy F. Adams; Pamela S. Adams, both of 1617 N. Ironwood, #2, Apache Junction, Ariz. 85220

[21] Appl. No.: 207,955

[22] Filed: Mar. 7, 1994

[51] Int. Cl.$^6$ .............................................. B65H 3/06
[52] U.S. Cl. ................... 221/259; 221/227; 221/279; 221/231; 221/43; 221/251; 221/283
[58] Field of Search ............... 221/259, 277, 279, 226, 221/231, 235, 36, 43, 251, 283

[56] References Cited

U.S. PATENT DOCUMENTS

| | | | |
|---|---|---|---|
| 460,775 | 10/1891 | Grosvenor et al. | 221/259 X |
| 2,330,256 | 9/1943 | Ashton | 221/283 X |
| 4,269,324 | 5/1981 | Hausam | 221/36 |
| 4,339,057 | 7/1982 | Winters | 221/231 X |
| 4,662,536 | 4/1987 | Powers | 221/43 |
| 4,905,870 | 3/1990 | Mamolou | 221/36 |
| 4,957,217 | 9/1990 | Ritson | 221/210 |
| 4,971,222 | 11/1990 | Rohde et al. | 221/210 |
| 5,067,627 | 11/1991 | Anderson | 221/36 |
| 5,097,984 | 3/1992 | Meisner et al. | 221/283 X |
| 5,244,115 | 9/1993 | Huck | 221/259 X |

*Primary Examiner*—Robert P. Olszewski
*Assistant Examiner*—Dean A. Reichard
*Attorney, Agent, or Firm*—John R. Flanagan

[57] ABSTRACT

A coffee filter storage and dispensing canister includes a container body having an interior compartment storing an inverted stack of coffee filters and one end with a dispensing opening for dispensing coffee filters therefrom, a cover removably fitted on an opposite end of the container body, a hold-down member disposed over the inverted stack of coffee filters, and a plurality of biasing elements disposed between the cover and hold-down member causing the hold-down member to exert a hold-down force on the inverted stack of coffee filters biasing the stack toward the dispensing opening of the container body. The canister also includes a filter separator crank and a filter retainer arm installed adjacent to the dispensing opening of the container body and extending within the interior compartment thereof. The filter separator crank is operable for separating a lowermost one of the coffee filters from the inverted stack thereof and moving the lowermost one filter from the container body through the dispensing opening to dispense the one filter therefrom. The filter retainer arm releasably engages the lowermost coffee filter and retains the remainder of the coffee filters of the inverted stack thereof within the container body as the lowermost one of the coffee filters is dispensed therefrom.

19 Claims, 2 Drawing Sheets

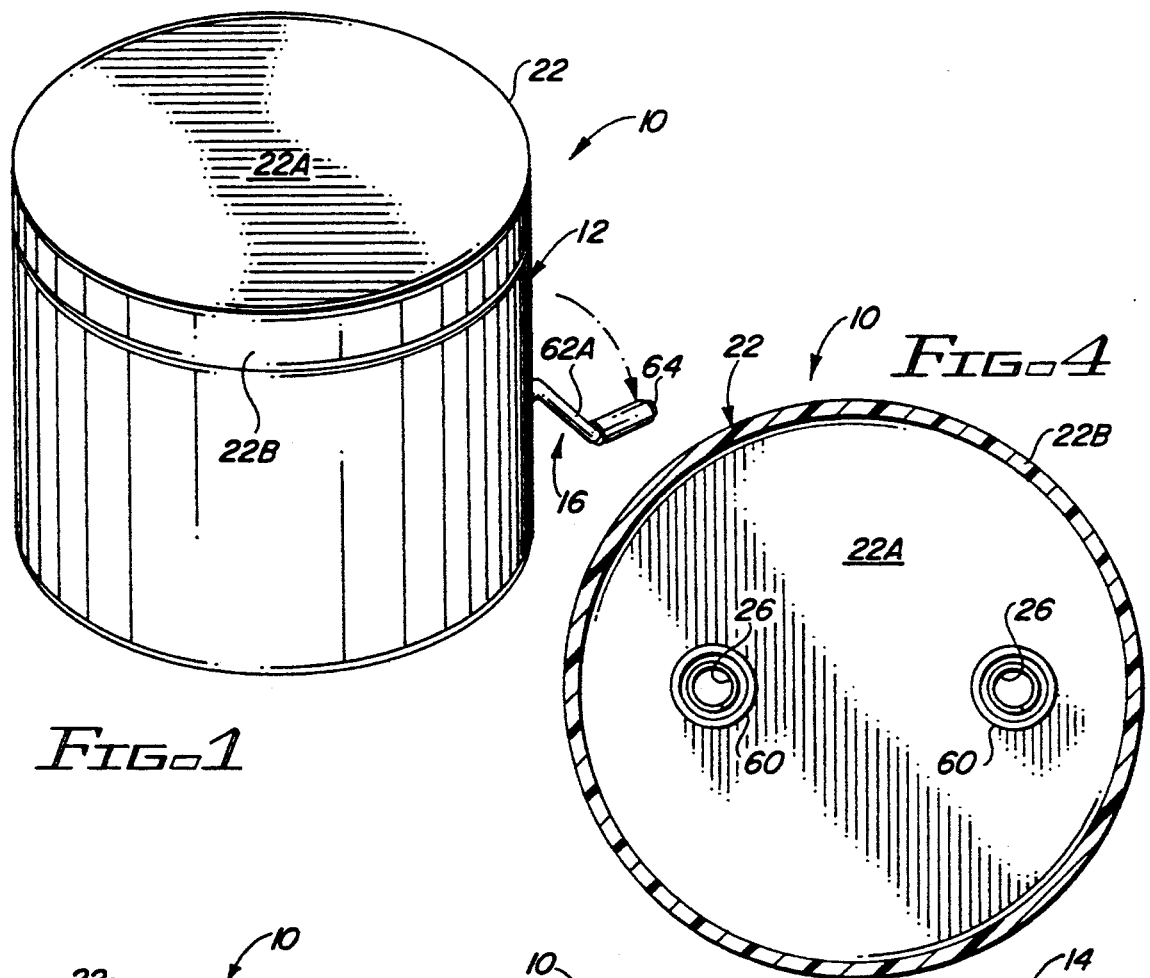
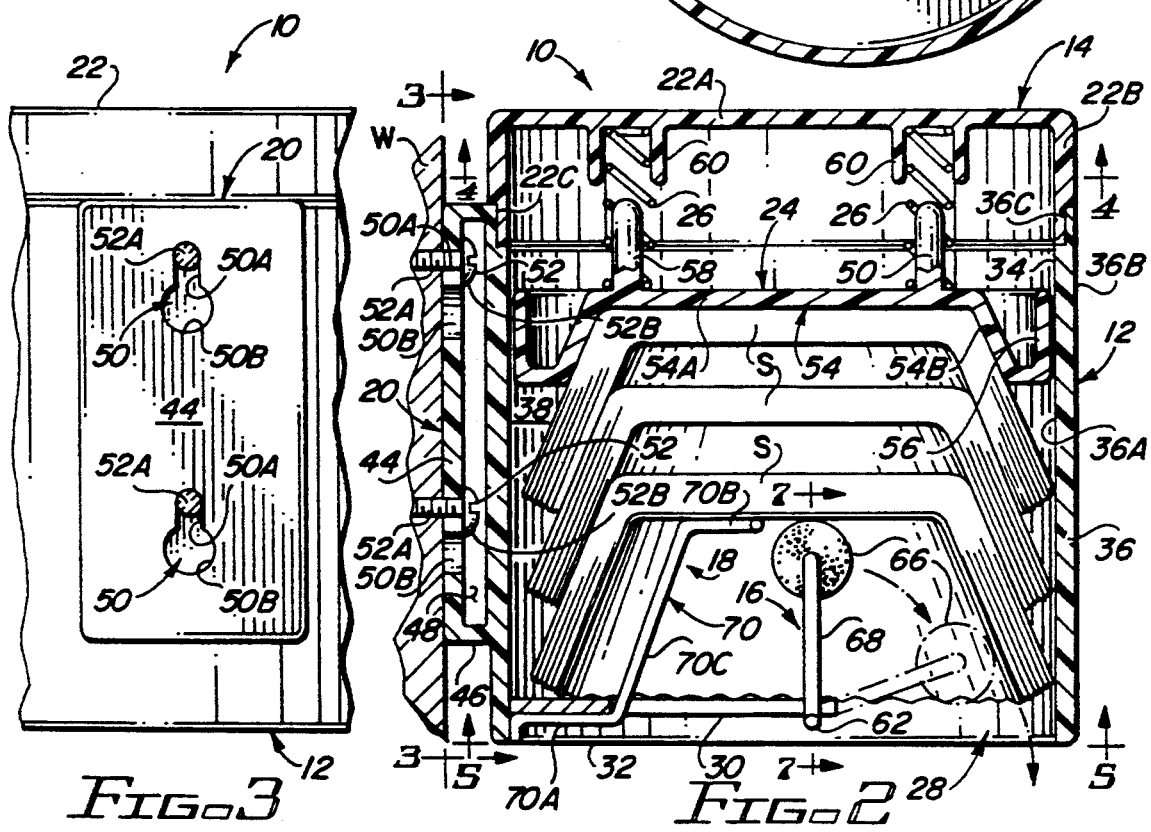

COFFEE FILTER STORAGE AND DISPENSING CANISTER

BACKGROUND OF THE INVENTION

1. Field of the Invention

The present invention generally relates to coffee filter dispensers and, more particularly, is concerned with a coffee filter storage and dispensing canister.

2. Description of the Prior Art

The automatic drip coffee maker has become a universal favorite over the past few decades. The convenience of this appliance plus the high quality of the coffee brewed therein have provided important benefits to coffee drinkers everywhere. As is well known, a thin-walled paper coffee filter is utilized with this coffee maker. Such coffee filters are commonly sold in nested, tightly stacked packages. Such tight stacking together of the coffee filters generally makes removal of a single filter therefrom quite awkward and inefficient. The manual manipulation required is rather unsanitary and often results in the unnecessary waste of filters while separating an individual filter from the stack thereof.

A variety of coffee filter dispensers have been proposed in the prior patent art to overcome such difficulties. Representative examples of such prior art dispensers are disclosed in U.S. patents to Mamolou (U.S. Pat. No. 4,905,870), Ritson (U.S. Pat. No. 4,957,217), Rohde et al (U.S. Pat. No. 4,971,222) and Anderson (U.S. Pat. No. 5,067,627). The Mamolou and Ritson dispensers each provides a bowl-like container for storage of a plurality of coffee filters therein with gripping means attached to an overlying cover for separating the uppermost individual filter from the remaining filters therebelow. The Rohde et al dispenser provides a canister for storing a plurality of coffee filters having a movable dispensing applicator insertable into the canister for separating an uppermost individual filter from the remaining stack thereof. An alternative embodiment of the Rohde et al dispenser provides spring features disposed in the lower part thereof to facilitate compression of the filter stack against the gripping means provided on the movable dispensing applicator. The Anderson dispenser provides a housing for storing a plurality of coffee filters with a side dispensing flap and having a crank arm with depending gripping means installed through the top of the housing. The crank arm is circumferentially rotatable such that the gripping means depending therefrom separates an uppermost individual filter from the remaining stack thereof for dispensing the individual filter outwardly through the side dispensing flap.

The Mamolou, Ritson and Rohde et al dispensers are each fairly simple in design and construction, thereby being relatively inexpensive to produce. By contrast, the Anderson dispenser is quite complicated in design and construction and thus appears to be far more costly to manufacture. Each of the four dispensers provides gripping means focused solely on separating an individual filter from a densely packed stack thereof. The efficiency of such separating action is somewhat problematical, given the density of such filter packing and the peripheral corrugated configuration of each individual filter, being nested together. Additionally, there is often very limited space available for the location of such dispensers near the automatic coffee maker.

Consequently, a need still exists for a coffee filter dispenser which provides dual cooperating gripping means for coordinating the separating and dispensing of an individual filter from the dispenser while retaining the remaining filters therein.

SUMMARY OF THE INVENTION

The present invention provides a coffee filter storage and dispensing canister being designed to satisfy the aforementioned need by avoiding the drawbacks of the prior art without introducing other drawbacks. Instead, the storage and dispensing canister of the present invention provides expanded capabilities not available in the prior art devices.

One capability is the simplicity in design and construction of the storage and dispensing canister for inexpensive manufacture and ease in use. A second capability is the dual cooperating gripping means provided by the canister. A coordinated operation is thereby achieved for separating and dispensing an individual filter from the canister and for retaining the remaining filters therein at the same time. Such cooperation of the dual gripping means promotes greater efficiency in the dispensing process. A third capability is the easy mountability of the canister to a wall or other support structure near an automatic coffee maker for optimum utilization of the available space.

Accordingly, the present invention is directed to a coffee filter storage and dispensing canister which comprises: (a) a container body having an interior compartment for storing an inverted stack of coffee filters therein and one end with a dispensing opening for dispensing coffee filters therefrom; (b) first means connected to the container body and disposed over the inverted stack of coffee filters in the interior compartment for exerting a hold-down force on the inverted stack of coffee filters toward the one end of the container body having the dispensing opening; (c) second means disposed adjacent to the one end of the container body and the dispensing opening therein and extending from exteriorly of the container body to within the interior compartment thereof for separating a lowermost one of the coffee filters from the inverted stack thereof and moving the lowermost one filter from the container body through the dispensing opening to dispense the one filter therefrom; and (d) third means disposed adjacent to the one end of the container body and the dispensing opening therein and within the interior compartment thereof for releasably engaging the lowermost coffee filter and retaining the remainder of the coffee filters of the inverted stack thereof within the container body as the lowermost one of the coffee filters is dispensed therefrom. Also, the canister includes a filter rest member attached to and disposed within the interior compartment of the container body at the one end thereof and defining the dispensing opening. The rest member is generally C-shaped and adapted for supporting the inverted stack of coffee filters in the container body.

More particularly, the first means includes a cover removably fitted on an opposite end of the container body, a hold-down member disposed over the inverted stack of coffee filters, and a plurality of biasing elements disposed and extending between the cover and hold-down member for causing the hold-down member to exert the hold-down force on the inverted stack of coffee filters and bias the stack toward the dispensing opening of the container body. The biasing elements are a pair of coil springs. The cover has a pair of annular seats defined on an interior surface thereof adapted to seat the one ends of the coil springs therein. The hold-down member has a pair of lugs attached thereto and extending upwardly therefrom and aligned with the seats on the cover for receiving the opposite ends of the coil springs thereon.

The second means is a filter separator crank operable for engaging and separating the lowermost one of the coffee filters from the inverted stack thereof and causing it to be moved from the container body through the dispensing opening. The third means is a filter retainer arm operable for releasably engaging the lowermost coffee filter and retaining the remainder of the coffee filters of the inverted stack thereof within the container body as the lowermost one of the coffee filters is dispensed therefrom.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of the coffee filter storage and dispensing canister of the present invention.

FIG. 2 is an enlarged longitudinal sectional view of the canister, showing a filter separator crank and a filter retainer arm relative to a lowermost inverted stack of coffee filters stored within the body of the canister.

FIG. 3 is a fragmentary rear elevational view of the canister as seen along line 3—3 of FIG. 2, showing a mounting portion of the canister for mounting the storage and dispensing canister to a wall or other support structure.

FIG. 4 is a bottom plan view of a cover of the canister, taken along line 4—4 of FIG. 2, showing a pair of annular seats defined thereon for seating a pair of coil springs therein.

DETAILED DESCRIPTION OF THE INVENTION

Figure 5:
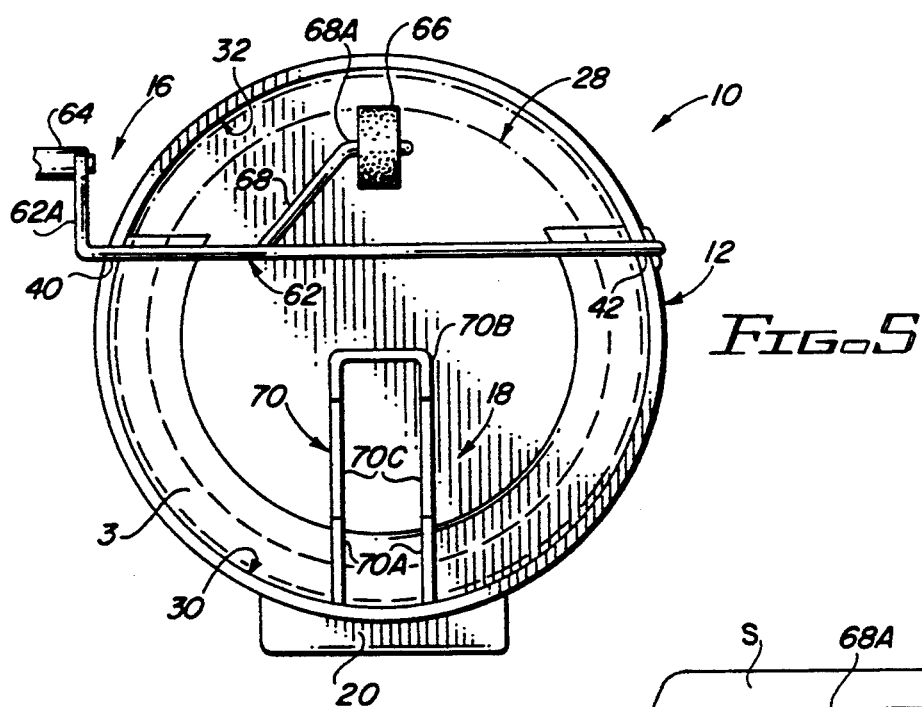
FIG. 5 is a bottom plan view of the canister as seen along line 5—5 of FIG. 2 turned counterclockwise 45°, showing the filter separator crank and filter retainer arm installed into the body of the canister.

Referring to the drawings, and particularly to FIGS. 1 and 2, there is illustrated a coffee filter storage and dispensing canister, generally designated 10, constructed in accordance with the principles of the present invention. In its basic components, the coffee filter storage and dispensing canister 10 includes a container body 12, a hold-down means 14, a filter separator crank 16, and a filter retainer arm 18.

The container body 12 is adapted for storing at least one and preferably a plurality of stacks S of coffee filters F in an inverted stacked orientation therein and has a mounting structure 20 attached to and extending along the outside of a side portion 12A of the container body 12. The mounting structure 20 is adapted to removably mount the container body 12 to a support structure, such as a wall W. The hold-down means 14 includes a cover 22, a hold-down member 24 and a plurality of biasing elements 26 disposed between the cover 22 and the hold-down member 24. The cover 22 is adapted to removably fit over an upper open end of the container body 12. The hold-down member 24 is adapted to be placed over the coffee filter stacks S within the container body 12. The biasing elements 26 are disposed and extend between the cover 22 and the hold-down member 4 and cause the hold-down member 24 to exert a hold-down force on the inverted stacks S of coffee filters F and bias the stacks S toward a dispensing opening 28 in the container body 12. The filter separator crank 16 is manually operable for engaging, separating and dispensing the coffee filters F individually from the container body 12 through the dispensing opening 28 thereof. The filter retainer arm 18 is mounted for releasably retaining a lowermost coffee filter stack S within the container body 12 as an individual filter F is dispensed therefrom. Also, the canister 10 includes a generally U-shaped filter rest member 30 adapted to support the plurality of inverted coffee filter stacks S thereon within the container body 12 and above the filter separator crank 16 and filter retainer arm 18.

Referring to FIGS. 1—3 and 5—7, the container body 12 of the coffee filter storage and dispensing canister 10 includes an open bottom end 32, an open top end 34 and an endless annular sidewall 36 having a cylindrical configuration and having opposite inner and outer surfaces 36A, 36B extending between the open bottom and top ends 32, 34. The inner surface 36A has an annular recess 36C defined adjacent to the open top end 34. The annular sidewall 36 of the container body 12 defines a generally cylindrical internal compartment 38 between the opposite open bottom and top ends 32, 34 of the container body 12 being adapted for storing the plurality of inverted stacks S of coffee filters F therein. The annular sidewall 36 has a pair of circumferentially spaced holes 40, 42 defined through a pair of opposite side portions thereof and being angularly displaced from the mounting structure 20 and located adjacent to and spaced a short distance above the open bottom end 32 of the container body 12.

Figure 7:
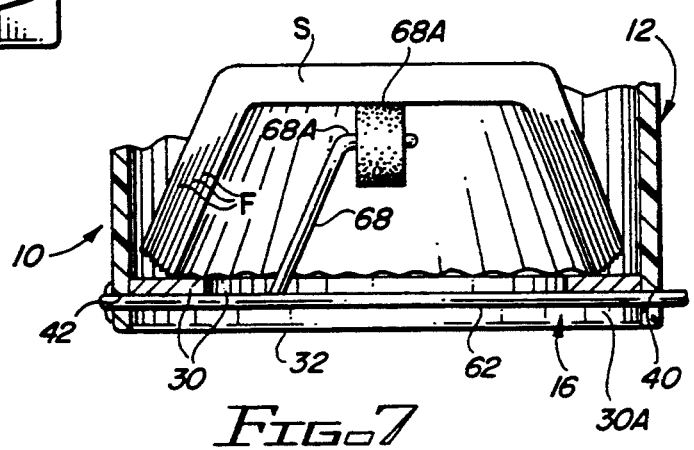
FIG. 7 is a fragmentary longitudinal sectional view of the canister taken along line 7—7 of FIG. 2.
Figure 6:
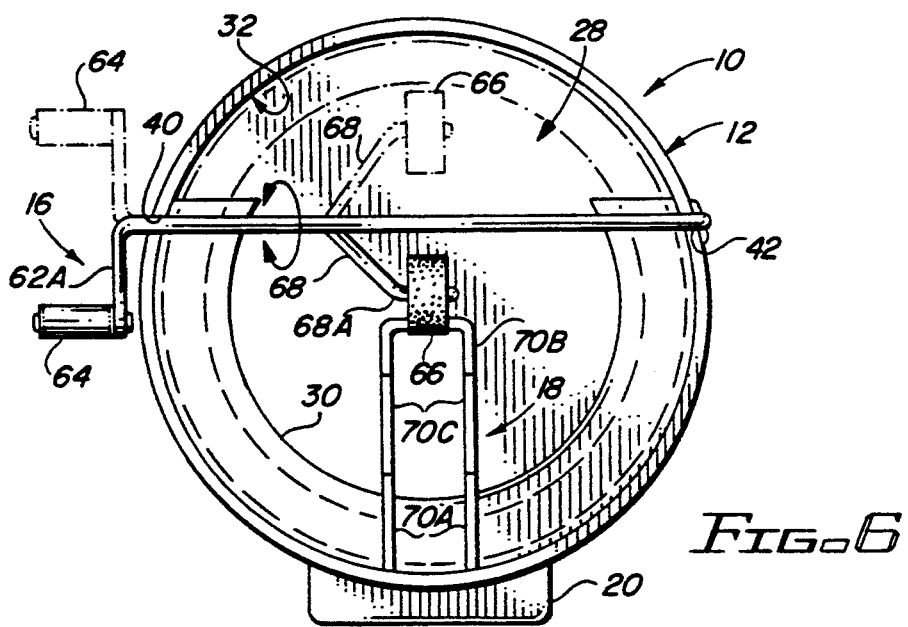
FIG. 6 is another bottom plan view of the canister similar to that of FIG. 5.

Also, as seen in FIGS. 2, 6 and 7, the U-shaped filter rest member 30 is secured to the interior surface 36A of the annular sidewall 36 and is spaced above the open bottom end 32 of the container body 12 and above the holes 40, 42 in the sidewall 36. The rest member 30 has a flat configuration and extends partially about the perimeter of the sidewall 36 and defines the wedge-shaped dispensing opening 28 in the open bottom end 32 of the container body 12 adjacent to an end of the filter rest member 30 for dispensing the lowermost individual coffee filter F therethrough and outwardly from the container body 12.

Referring further to FIGS. 2 and 3, the mounting structure 20 of the container body 12 includes a flat outer end wall 44 of generally rectangular configuration and an endless peripheral sidewall 46. The peripheral sidewall 46 is attached about the periphery of the flat outer end wall 44 and extends between and interconnects the flat outer end wall 44 with the outer surface 36B of the annular sidewall 36 at the one side portion 12A of the container body 12 so as to define an internal cavity 48 therebetween. A pair of inverted key holes 50 are defined through the flat outer end wall 44 of the mounting structure 20 and are spaced vertically from one another.

As seen in FIGS. 2 and 3, the respective outer portions of the stem 52A and head 52B of a pair of vertically spaced and outwardly protruding screw fasteners 52 partially screwed horizontally into the wall W extend through the inverted key holes 50 and into the internal cavity 48 of the mounting structure 20. With the screw fastener head 52B being larger in diameter than an upper portion 50A of each inverted key hole 50 and smaller in diameter than the lower portion 50B thereof and with the screw fastener stem 52A being smaller in diameter than both upper and lower portions 50A, 50B of each inverted key hole 50, the protruding screw fasteners 52 and the mounting structure 20 on the canister 10 are cooperable together in a known manner to removably but securely mount and hang the canister 10 over the outwardly protruding screw fasteners 52 on the surface of the wall W.

Referring to FIG. 2, the hold-down member 24 of the hold-down means 14 of the coffee filter storage and dispensing canister 10 has a dome-shaped middle cap 54 and an outer annular rim 56 attached thereto. The dome-shaped middle cap 54 has a flat top portion 54A and an annular side portion 54B attached to a peripheral edge thereof and extending downwardly and outwardly therefrom. The middle cap 54 is thereby open at the bottom and closed at the top and is of sufficient diameter for placement over the uppermost inverted stack S of coffee filters F stored in the internal compartment 38 of the container body 12. Also, the flat top portion 54A of the middle cap 54 has a pair of bullet-shaped lugs 58 attached to and extending upwardly from an upper surface of the flat top portion 54A thereof. The outer annular rim 56 is attached at a lower end to a lower peripheral edge of the annular side portion 54B of the middle cap 56. The outer annular rim 56 has an outside diameter slightly less than an inside diameter of the annular sidewall 36 of the container body 12 so as to permit the hold-down member 24 to fit within and slidably move vertically along the inner surface 36A of the annular sidewall 36 of the container body 12.

Referring to FIGS. 1-4, the cover 22 of the coffee filter storage and dispensing canister 10 has a flat top wall 22A and an annular side wall 22B attached to a peripheral edge of the flat top wall 22A and extending downwardly therefrom to a lower open end. An annular recess 22C is defined adjacent to the lower open end of the annular side wall 22B thereof so as to adapt the cover 22 to snugly and removably fit over the top open end of the container body 12. The flat top wall 22A of the cover 22 has a pair of annular seats 60 attached on a lower surface thereof which are aligned above the lugs 58 on the middle cap 54 of the hold-down member 24. The biasing elements in the form of the coil springs 26 are received at upper ends thereof in the annular seats 60 on the cover 22 and extend at opposite lower ends thereof over the lugs 58 on the hold-down member 24. The coil springs 26 so disposed between the cover 22 and hold-down member 24 cause the hold-down member 24 to exert a hold-down force on the inverted stacks S of coffee filters F and thereby bias the stacks S toward the dispensing opening 28 in the bottom end wall 32 of the container body 12.

Referring to FIGS. 1, 2 and 5-7, the filter separator crank 16 of the coffee filter storage and dispensing canister 10 has an elongated shaft 62 of cylindrical configuration, an external handle 64, an internal non-rotatable gripping element 66, and means 68 for mounting the gripping element 66 outwardly from the shaft 62. The shaft 62 extends between and through the spaced holes 40, 42 in the annular sidewall 36. The handle 64 is connected to an upturned end 62A of the shaft 62 which extends from the one hole 40 so as to locate the handle 64 at the exterior of the container body 12, with the shaft 62 and gripping element 66 being located within the interior compartment 38 of the container body 12. The internal gripping element 66 preferably takes the form of a non-rotatable cylindrical wheel or roller 66. The gripping element mounting means 68 is an elongated extension member 68 rigidly connected to the shaft 62 nearer to the handle end thereof than to the opposite end and extending angularly outwardly therefrom and mounting the gripping element 66 at the outer end 68A thereof. By manually turning the handle 64 rotational motion is applied to the shaft 62 causing the gripping element 66 to move through an arc from the vertical position to the horizontal positions, as shown in FIGS. 2 and 6, and thereby engage and separate a lowermost one of the coffee filter F from an inverted lowermost stack S thereof stored within the container body 12 resting upon the filter rest member 30 and move and dispense the separated lowermost one filter through and outwardly from the dispensing opening 28 in the open bottom end 32 of the container body 12.

Referring still to FIGS. 1, 2 and 5-7, the filter retainer arm 18 of the coffee filter storage and dispensing canister 10 takes the form of a U-shaped wire-like member 70 having an outer end portion 70A, an inner end portion 70B and a middle portion 70C extending between and interconnecting the outer and inner end portions 70A, 70B. The outer end portion 70A of the U-shaped retainer member 70 is attached to the inner surface 36A of the annular sidewall 36 of the container body 12 adjacent to the open bottom end 32 thereof and extends radially inwardly therefrom. The inner end portion 70B of the U-shaped retainer member 70 releasably engages the center of the inverted stack S of coffee filters for retaining the stack S within the container body 12 as a lowermost one of the filters F is dispensed therefrom by operation of the crank 16. The U-shaped retainer member 70 is bent such that the middle portion 70C thereof extends in an inclined relation to the generally parallel outer and inner end portions 70A, 70B so as to support the inner end portion 70B generally at the center of the filter stack S.

It should be readily apparent that the cover 22, hold-down member 24 and biasing elements 26 can be temporarily removed from the container body 12 for allowing a new supply of stacks S of coffee filters F to be placed within the internal compartment 38 of the container body 12. Then, the hold-down member 24, biasing elements 26 and cover 22 are replaced on the container body 12.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A coffee filter storage and dispensing canister, comprising:
    (a) a container body having an interior compartment for storing an inverted stack of coffee filters therein and one end with a dispensing opening for dispensing coffee filters therefrom;

(b) first means connected to said container body and disposed over the inverted stack of coffee filters in said interior compartment for exerting a hold-down force on the inverted stack of coffee filters toward said one end of said container body having said dispensing opening;

(c) second means disposed adjacent to said one end of said container body and said dispensing opening therein and extending from exteriorly of said container body to within said interior compartment thereof for separating a lowermost one of the coffee filters from the inverted stack thereof and moving the lowermost one filter from said container body through said dispensing opening to dispense the one filter therefrom; and (d) third means disposed adjacent to said one end of said container body and said dispensing opening therein and extending within said interior compartment thereof for releasably retaining the coffee filters of the inverted stack thereof within said container body so as to permit dispensing of the lowermost one of the coffee filters therefrom;

(e) said first means including a cover removably fitted on an opposite end of said container body, a hold-down member disposed over the inverted stack of coffee filters, and a plurality of biasing elements disposed between said cover and hold-down member causing said hold-down member to exert the hold-down force on the inverted stack of coffee filters and bias the stack toward said dispensing opening of said container body;

(f) said cover of said first means having a flat top portion and an annular side portion attached to a peripheral edge of said flat top portion and extending downwardly therefrom to a lower open end adapting said cover to fit over a top open end of said container body., said flat top portion having a pair of annular seats defined on an interior surface thereof adapted to seat first ends of said biasing elements therein.

2. The canister of claim 1 wherein said hold-down member includes a dome-shaped middle cap and an outer annular rim attached thereto, said middle cap being open at a bottom end and closed at a top end and thereby adapted to rest over the inverted stack of coffee filters stored in said internal compartment of said container body, said middle cap having a pair of lugs attached to and extending upwardly from said middle cap and aligned with said seats on said cover for receiving opposite ends of said biasing elements thereon.

3. The canister of claim 2 wherein said biasing elements are coil springs received at said first ends thereof in said seats on said cover and extending at said opposite ends over said lugs on said hold-down member.

4. The canister of claim 2 wherein said outer annular rim of said hold-down member has an outside diameter slightly less than an inside diameter of said container body so as to permit said hold-down member to fit within and slidably move along said container body.

5. The canister of claim 2 wherein:
said middle cap has a flat top portion and an annular side portion attached to a peripheral edge thereof and extending downwardly and outwardly therefrom; and
said outer annular rim being attached at a lower end to a lower peripheral edge of said annular side portion of said middle cap and extending upwardly therefrom.

6. The canister of claim 1 further comprising:
a filter rest member attached to and disposed within said interior compartment of said container body at said one end thereof and defining said dispensing opening, said rest member being adapted for supporting the inverted stack of coffee filters in said container body.

7. The canister of claim 1 wherein said container body has an open bottom end, an open top end and an endless annular sidewall extending therebetween.

8. The canister of claim 7 wherein said endless annular sidewall has a pair of circumferentially spaced holes defined therein and spaced above said open bottom end of said container body.

9. The canister of claim 8 wherein said second means is a filter separator crank having a shaft extending between and through said spaced holes in said annular sidewall of said container body, a non-rotatable gripping element, means for mounting said gripping element outwardly from said shaft, and a handle connected to an end of said shaft extending through one of said holes so as to locate said handle at the exterior of said container body with said shaft and gripping element being disposed in said interior compartment of said container body such that by manually turning said handle rotational motion is applied to said shaft so as to cause said gripping element to move in an arc and engage and separate the lowermost one of the coffee filters from the inverted lowermost stack thereof and dispense the lowermost one filter through and outwardly from said dispensing opening of said container body.

10. A coffee filter storage and dispensing canister, comprising:

(a) a container body defining an interior compartment for storing an inverted stack of coffee filters therein, said container body having an end with means for dispensing coffee filters from said interior compartment of said body;

(b) a mounting structure attached externally on a side portion of said container body and being adapted for mounting said container body on a surface of a vertical support structure;

(c) means connected to said container body and disposed over the inverted stack of coffee filters in said interior compartment thereof for exerting a hold-down force on the inverted stack of coffee filters toward said end of said container body having said dispensing means;

(d) a filter separator crank installed adjacent to said end of said container body and extending from exteriorly of said container body to within said interior compartment thereof, said filter separator crank being operable to undergo pivotal movement relative to the inverted stack of coffee filters for engaging and separating a lowermost one of the coffee filters from the inverted stack thereof and moving the lowermost one filter from said container body through said dispensing means thereof to dispense the one filter therefrom; and (e) a filter retainer arm installed adjacent to said end of said container body and being adapted to engage the inverted stack of filters for releasing the lowermost coffee filter and retaining the remainder of the coffee filters of the inverted stack thereof within said container body as the lowermost one of the coffee filters is dispensed therefrom;

(f) said hold-down force exerting means including a cover removably fitted on an opposite end of said container body, a hold-down member disposed over the inverted stack of coffee filters, and a plurality of biasing elements disposed between said cover and hold-down member causing said hold-down member to exert the hold-down force on the inverted stack of coffee filters biasing the stack toward said dispensing opening of said container body, said cover being adapted to fit over a top open end of said container body and has a pair of annular seats defined on an interior surface thereof adapted to seat said biasing elements therein.

11. The canister of claim 10 wherein said mounting structure has a rectangular configuration and is spaced from and integrally formed and connected with said side portion of said container body thereby defining an internal cavity therebetween and having a pair of spaced inverted key hole shaped openings defined therein for receiving a pair of fasteners therethrough for attaching said container body to a support structure.

12. The canister of claim 10 further comprising:
   a filter rest member attached to and disposed within said interior compartment of said container body at said one end thereof and defining said dispensing opening, said rest member being adapted for supporting the inverted stack of coffee filters in said container body.

13. The canister of claim 10 wherein said hold-down member includes a dome-shaped middle cap and an outer annular rim attached thereto, said middle cap being open at a bottom end and closed at a top end and thereby adapted to rest over the inverted stack of coffee filters stored in said internal compartment of said container body, said middle cap having a pair of lugs attached to and extending upwardly from said middle cap and aligned with said seats on said cover for receiving said biasing elements.

14. The canister of claim 13 wherein said biasing elements are coil springs received at upper ends in said seats on said cover and extending at lower ends over said lugs on said hold-down member.

15. A coffee filter storage and dispensing canister, comprising:
   (a) a container body having an interior compartment for storing an inverted stack of coffee filters therein and one end with a dispensing opening for dispensing coffee filters therefrom;
   (b) first means connected to said container body and disposed over the inverted stack of coffee filters in said interior compartment for exerting a hold-down force on the inverted stack of coffee filters toward said one end of said container body having said dispensing opening;
   (c) second means disposed adjacent to said one end of said container body and said dispensing opening therein and extending from exteriorly of said container body to within said interior compartment thereof for separating a lowermost one of the coffee filters from the inverted stack thereof and moving the lowermost one filter from said container body through said dispensing opening to dispense the one filter therefrom; and
   (d) third means disposed adjacent to said one end of said container body and said dispensing opening therein and extending within said interior compartment thereof for releasably retaining the coffee filters of the inverted stack thereof within said container body so as to permit dispensing of the lowermost one of the coffee filters therefrom;
   (e) said container body having an open bottom end, an open top end and an endless annular sidewall extending therebetween, said endless annular sidewall has a pair of circumferentially spaced holes defined therein and spaced above said open bottom end of said container body;
   (f) said second means including a filter separator crank having a shaft extending between and through said spaced holes in said annular sidewall of said container body, a non-rotatable gripping element, means for mounting said gripping element outwardly from said shaft, and a handle connected to an end of said shaft extending through one of said holes so as to locate said handle at the exterior of said container body with said shaft and gripping element being disposed in said interior compartment of said container body such that by manually turning said handle rotational motion is applied to said shaft so as to cause said gripping element to move in an arc and engage and separate the lowermost one of the coffee filters from the inverted lowermost stack thereof and dispense the lowermost one filter through and outwardly from said dispensing opening of said container body.

16. The canister of claim 15 wherein said first means includes:
   a cover removably fitted on an opposite end of said container body;
   a hold-down member disposed over the inverted stack of coffee filters; and
   a plurality of biasing elements disposed between said cover and hold-down member causing said hold-down member to exert the hold-down force on the inverted stack of coffee filters and bias the stack toward said dispensing opening of said container body.

17. The canister of claim 16 wherein said cover has a flat top portion and an annular side portion attached to a peripheral edge of said flat top portion and extending downwardly therefrom to a lower open end adapting said cover to fit over a top open end of said container body, said flat top portion having a pair of annular seats defined on an interior surface thereof adapted to seat first ends of said biasing elements therein.

18. The canister of claim 15 wherein said gripping element mounting means is an extension member connected to said shaft and extending angularly outwardly therefrom and mounting said gripping element at an outer end thereof.

19. The canister of claim 15 wherein said third means is a filter retainer arm having an outer end portion, an inner end portion and a middle portion extending between and interconnecting said inner and outer end portions, said outer end portion being attached to said annular sidewall of said container body adjacent to said open bottom end thereof, said inner end portion releasably engaging the inverted stack of coffee filters for retaining said stack within said container body as a lowermost one of said filters is dispensed therefrom.

* * * * *